United States Patent
Garrec et al.

(10) Patent No.: US 8,576,112 B2
(45) Date of Patent: Nov. 5, 2013

(54) BROADBAND MULTIFUNCTION AIRBORNE RADAR DEVICE WITH A WIDE ANGULAR COVERAGE FOR DETECTION AND TRACKING, NOTABLY FOR A SENSE-AND-AVOID FUNCTION

(75) Inventors: Patrick Garrec, Merignac (FR); Pascal Cornic, Guilers (FR); Stéphane Kemkemian, Paris (FR)

(73) Assignee: Thales, Neuilly sur Seine (FR)

( * ) Notice: Subject to any disclaimer, the term of this patent is extended or adjusted under 35 U.S.C. 154(b) by 19 days.

(21) Appl. No.: 12/872,673

(22) Filed: Aug. 31, 2010

(65) Prior Publication Data

US 2011/0160941 A1  Jun. 30, 2011

(30) Foreign Application Priority Data

Sep. 4, 2009 (FR) ...................................... 09 04224

(51) Int. Cl.
   *G01S 13/00* (2006.01)
(52) U.S. Cl.
   USPC .................. 342/29; 342/27; 342/28; 342/63; 342/65
(58) Field of Classification Search
   USPC ............. 342/29, 28, 27, 59, 61–65, 165, 173; 701/2, 400
   See application file for complete search history.

(56) References Cited

U.S. PATENT DOCUMENTS

| | | | |
|---|---|---|---|
| 4,115,771 A * | 9/1978 | Litchford ........................ | 342/37 |
| 4,370,656 A * | 1/1983 | Frazier et al. ................. | 342/458 |
| 4,746,924 A * | 5/1988 | Lightfoot ....................... | 342/453 |
| 5,821,895 A * | 10/1998 | Hounam et al. .............. | 342/25 F |
| 6,311,108 B1 * | 10/2001 | Ammar et al. .................. | 701/16 |
| 2003/0137444 A1* | 7/2003 | Stone et al. ...................... | 342/30 |
| 2004/0174295 A1* | 9/2004 | Stayton et al. ................ | 342/182 |
| 2005/0035897 A1* | 2/2005 | Perl et al. ......................... | 342/29 |
| 2008/0284637 A1* | 11/2008 | Blessing et al. ................ | 342/30 |
| 2009/0055038 A1 | 2/2009 | Garrec et al. | |
| 2009/0243911 A1 | 10/2009 | Cornic et al. | |
| 2010/0149019 A1* | 6/2010 | Smith et al. ..................... | 342/30 |
| 2010/0204867 A1* | 8/2010 | Longstaff ........................ | 701/26 |
| 2011/0169684 A1* | 7/2011 | Margolin ........................ | 342/30 |

FOREIGN PATENT DOCUMENTS

| | | |
|---|---|---|
| WO | 2006/053868 A1 | 5/2006 |
| WO | 2007/063126 A1 | 6/2007 |
| WO | 2008/134815 A1 | 11/2008 |

OTHER PUBLICATIONS

Francois Le Chevalier, "Space-Time Transmission and Coding for Airborne Radars", Radar Science and Technology, Dec. 2008, pp. 1-16, vol. 6, No. 6, Bimonthly Journal of Chinese Institute of Electronics.

* cited by examiner

*Primary Examiner* — Kaitlin Joerger
(74) *Attorney, Agent, or Firm* — Baker & Hostetler LLP

(57) ABSTRACT

A multifunction airborne radar device includes a plurality of transmit antenna modules and/or receive antenna modules that are fixed relative to the aircraft, placed substantially over the surface of the aircraft so as to form transmit and receive beams, enabling targets to be detected for implementing a sense-and-avoid function. The airborne radar device may also comprise processing means for tracking the detected targets and for generating information sent to an air traffic control center and/or to a control device on board the aircraft. The processing device may also receive data relating to the aircraft, enabling the antenna beams to be adjusted and the tracking calculations to be refined.

35 Claims, 6 Drawing Sheets

BROADBAND MULTIFUNCTION AIRBORNE RADAR DEVICE WITH A WIDE ANGULAR COVERAGE FOR DETECTION AND TRACKING, NOTABLY FOR A SENSE-AND-AVOID FUNCTION

CROSS-REFERENCE TO RELATED APPLICATIONS

This application claims priority to foreign France patent application No. 0904224, filed on Sep. 4, 2009, the disclosure of which is hereby incorporated by reference in its entirety.

TECHNICAL FIELD

The present invention relates to a broadband multifunction airborne radar device with a wide angular coverage for detection and tracking for a sense-and-avoid function. It applies notably to the field of airborne radars and more particularly to the field of radars for implementing a sense-and-avoid function.

BACKGROUND

Pilot-assisted air vehicles, or even unmanned air vehicles or UAVs, also known as "drones", presently fly in segregated zones. However, ATC (air traffic control) airspace, in which notably civil aircraft fly, is set to become populated by an increasing number of vehicles of the aforementioned types. It is consequently necessary for these aircraft to be able to fly in all classes of air space, and to cross frontiers, without them in any way representing a risk to humans. Thus, these aircraft must demonstrate a level of safety at least equal to that of aircraft having a pilot on board, whether they are being flown by the pilot or are preprogrammed or indeed operating completely automatically. Drones must notably employ a sense-and-avoid system enabling them to detect objects that may potentially be obstacles to their flight and to implement avoidance procedures where appropriate. A sense-and-avoid system relies on a detection and tracking "sense" function and on an "avoid" function, which must pre-emptively modify the path of the aircraft in a protected zone, typically defined by a sphere centred on the aircraft, with a radius of 500 feet. This avoid function, in the case of cooperative equipment, is effected by the TCAS (the acronym for Traffic Alert Collision Avoidance System) or by the T2CAS (the acronym for Terrain and Traffic Collision Avoidance System) if detection of the ground is integrated by coupling with the data delivered by a radioaltimeter with which the aircraft is equipped.

A sense-and-avoid system may present a risk with respect to the safety of personnel and must consequently meet stringent requirements in terms of reliability and effectiveness. Such requirements are specified in standards, for example in the NATO standard STANAG 4671. Notably, it is necessary for a sense-and-avoid system to have an angular coverage at least equivalent to the visual coverage of a human pilot, i.e. typically about ±110° in azimuth and about ±20° in elevation. It is also required that the system be effective whatever the weather conditions. All these requirements are itemized in airborne radar system specifications and notably determine therein the angular performance characteristics, and also the range, that have to take into consideration the data refresh time. These requirements notably mean that a compromise has to be chosen between the range and the data refresh time, over a very wide angular field.

Radar systems fitted in aircraft known in the prior art notably comprise at least one mechanically rotated or electronic scanning antenna. Such systems operate at a high frequency and consequently have a narrow beam. They thus allow precise tracking, but their scanning rate must however be extremely high so as to cover the required wide angular field sufficiently rapidly. Furthermore, such systems have the drawback of requiring an excrescence on the structure of the drone, accommodating the motorized or electronic scanning antenna structure. This drawback entails aerodynamic and/or size constraints. In addition, the structure of the aircraft systematically incorporates components such as a landing gear, wings, etc., which represent as many masks, imposing an almost unique position of the antenna structure. This position is usually located on the nose of the aircraft, which is that part most exposed to impacts, for example by birds. Since the antenna structure is centred thereat, an impact on the nose of the aircraft may then entail a complete loss of the sense-and-avoid function. The redundancy of such a system is also tricky, if not impossible, to realize in practice.

Another drawback of the known systems of the prior art lies in the fact that they do not allow a plurality of functions to be carried out on the basis of the same physical architecture. Notably, the radar segment of systems intended for carrying out the sense-and-avoid function in drones operates in the millimeter band, typically in the Ka-band or the Ku-band. Now, the Ka-band for example does not enable weather conditions to be detected, narrow-beam or scanning radars not being able to carry out more than one function simultaneously. Thus, a scanning radar does not allow for a weather radar, itself operating in scanning mode, to be reliably detected since the probability of intercepting the signals is low.

Another drawback of the known systems of the prior art also lies in the fact that antenna scanning entails a relatively low probability of detecting obstacles. Moreover, the known systems of the prior art cannot hierarchize the danger level of the detected targets. In these systems, the target tracking can be carried out only in sampled mode, with the consequence of there being a risk of confusion, mainly in the presence of ground clutter, or else of ground vehicles. These systems focus onto particular targets, by switching from a standby mode to a tracking mode, but such switching nevertheless impairs the detection of potentially hazardous new targets.

Thus, multi-target tracking is limited by the mechanical constraints on the antenna. Such tracking may be implemented at very high scanning rates, for example with scanning times of less than two seconds, but this means a short integration time on the target and requires the use of high transmission power levels. Consequently, in the systems known from the prior art, since the refresh times are long and the integration time on the target is short, it is not possible for the receive channel to alleviate the deficiencies associated with scanning. The transmission power levels necessary for accomplishing the sense-and-avoid function are therefore high, with the following drawbacks:
  high power consumption;
  the necessity of operating the radar in pulsed mode;
  the necessity of using higher operating frequencies, for the purpose of allowing satisfactory spatial segregation, to the detriment of efficiency;
  the difficulty of ensuring effective heat dissipation, since the transmitter is centralized;
  the necessity of typically dedicating the nose of the aircraft to implementing the sense-and-avoid function;
  the difficulty of providing satisfactory immunity to electromagnetic radiation, because of the high transmission power;

the difficulty of making a system based on moving components of major criticality reliable;

antenna scanning has the consequence that targets are tracked discontinuously, these being sampled at the scanning rate. It is also necessary to associate, with each scan, the detected echoes with the corresponding tracks, even during turns by the carrier, except if the inertial guidance system of the latter is integrated into the tracking system, the inertial guidance system then being critical for the sense-and-avoid function;

the limitations inherent in multi-target tracking, notably the limitation on the number of tracks followed, and the necessity of operating specific antenna pointing means; and the necessity for a long illumination time for targets having a low radar cross section or RCS, making it difficult to achieve a good compromise between the data refresh rate and the quality of the tracking.

Known systems of the prior art for providing a sense-and-avoid function may also be based on cooperative modes; however such systems have the following drawbacks:

small private planes, powered ultra-lights, delta wings and balloon probes are not equipped with cooperative means; and in dense traffic zones, the existing standards relating to cooperative modes impose avoidance procedures on aircraft by a change of altitude, yet aircraft of the drone type may be incapable of sudden changes of altitude, because of a lack of engine power and because their aerodynamic finesse does not allow them to ascend or descend rapidly.

In any case, and for the reasons related to the aforementioned drawbacks, the use of cooperative modes alone is not feasible for providing a sense-and-avoid function.

SUMMARY OF THE INVENTION

The present invention alleviates the aforementioned drawbacks by providing a device for implementing a sense-and-avoid function in an aircraft, including in small aircraft, and not requiring a rotating or scanning antenna, notably lifting the device installation constraints associated with masks formed by parts of the aircraft structure.

One advantage of the invention is that it makes it possible to obtain a device, which forms the subject matter thereof, with a wide angular coverage in standby mode, with a high rate, without impairing the performance of the target tracking function.

Another advantage of the invention is that it allows the addition of related functions allowing greater functional compactness, such as bird collision prevention, weather detection, help in detecting atmospheric conditions, such as icing, and a beacon function for automatic landing gear.

Another advantage of the invention is that it is very tolerant to breakdowns.

For this purpose, one subject of the invention is a multifunction airborne radar device operating in active and passive modes, characterized in that it comprises a plurality of antenna modules fixed relative to the aircraft, which are placed substantially on the surface of the aircraft and form transmit and receive beams of width adapted to the aimed direction, allowing detection of targets for the implementation of a sense-and-avoid function.

In one embodiment of the invention, the antenna modules may be transmit and/or receive antenna modules.

In one embodiment of the invention, the antenna modules may comprise a plurality of individual receive channels and/or radiating elements.

In one embodiment of the invention, the antenna modules may conform to the surface of the aircraft and/or may be flat, and placed on and/or below the skin of the aircraft.

In one embodiment of the invention, the airborne radar device may be characterized in that it operates in the X-band, in sequential mode or in continuous mode.

In one embodiment of the invention, the airborne radar device may be characterized in that the receive and/or transmit antenna modules are placed in a unitary block that can be fastened to the nose of the aircraft.

In one embodiment of the invention, the airborne radar device may be characterized in that the receive and/or transmit antenna modules are distributed over various parts of the surface of the aircraft.

In one embodiment of the invention, the airborne radar device may be characterized in that it further comprises processing means which receive data from the receive antenna modules and send processed data to the transmit antenna modules, and which produce target tracking data for targets detected in active and passive modes.

In one embodiment of the invention, said processing means may send data to the transmit antenna modules capable of forming beams differing along various defined angular detection zones close to the aircraft.

In one embodiment of the invention, the airborne radar device may be characterized in that it can be used as a weather radar during defined time windows.

In one embodiment of the invention, the airborne radar device may be characterized in that the processing means further receive data relating to the aircraft, comprising information relating to its altitude, its velocity and/or its attitude, said data being exploited dynamically by the processing means.

In one embodiment of the invention, the airborne radar device may be characterized in that a first angular detection zone is defined, forward of the aircraft, by an angular aperture a on either side of the principal axis of the aircraft in the principal plane of the aircraft, a second angular detection zone being defined by a representation in the principal plane of the aircraft extending substantially from the boundary of said first detection zone as far as the perpendicular to the principal axis of the aircraft, and a third angular detection zone extending substantially rearward of the aircraft from the boundary of said second angular detection zone.

In one embodiment of the invention, said processing means may carry out a filtering operation with the aim of discriminating those targets detected in one of the three angular detection zones that have a negative measured Doppler velocity.

In one embodiment of the invention, said processing means may calculate the velocity of the detected targets and carry out an additional filtering operation centred on those targets detected in the first angular detection zone that have a substantially zero velocity, increasing the integration time over said targets having a substantially zero velocity.

In one embodiment of the invention, said processing means may carry out an additional filtering operation with the aim of discriminating said targets having a substantially zero velocity that are detected in the first angular detection zone, namely those emanating from ground clutter.

In one embodiment of the invention, the airborne radar device may be characterized in that the processing means carry out a filtering operation with the aim of discriminating targets detected in said third angular detection zone, namely those for which the Doppler velocity is not greater than the velocity of the aircraft.

In one embodiment of the invention, said processing means may cause the aperture angle α defining the first angular detection zone to be varied dynamically according to the aircraft data.

In one embodiment of the invention, said processing means may cause the transmit waveform, the integration time and/or the antenna modules used, to be dynamically varied according to the aircraft data.

In one embodiment of the invention, said processing means may generate a time window during which the airborne radar device is tuned to the frequency of the airborne weather radars, allowing their detection.

In one embodiment of the invention, said processing means may detect a fault in an antenna module and modify, where appropriate, the beams formed by the adjacent antenna modules so as to compensate for the loss of detection occasioned.

In one embodiment of the invention, said processing means may consolidate the target tracking on the basis of said detection of airborne weather radars by an association of the corresponding tracks.

In one embodiment of the invention, said processing means may comprise a tool box generating the data relating to the sense-and-avoid function, comprising the filtered tracks, the detected passive targets, the detection of airborne weather radars, the associations of targets, the required reaction times, the predicted points and angles of collision, the detection of clouds to the front of the aircraft, the calculated altitude of the aircraft and/or the detection of birds to the front of the aircraft.

In one embodiment of the invention, the data generated by the tool box may be communicated to the outside by radio links, data links and/or ADS-B links.

In one embodiment of the invention, the airborne radar device may be characterized in that it is capable of controlling an avoidance device on board the aircraft.

In one embodiment of the invention, the airborne radar device may be characterized in that the processing means calculate the altitude of the aircraft.

In one embodiment of the invention, the airborne radar device may be characterized in that it is capable of controlling external target detection devices enabling the tracking to be consolidated.

In one embodiment of the invention, the airborne radar device may be characterized in that it is capable of generating radio messages describing the position, velocity, attitude and/or manoeuvres of the aircraft.

Another subject of the present invention is an automatic aircraft landing system, comprising an airborne radar device as described in the abovementioned embodiments, and at least one radio beacon on the ground close to an airport runway, characterized in that the airborne radar device is configured, during defined time windows, in order for specific signals to be sent to and/or received from said radio beacons on the ground.

In one embodiment of the invention, said automatic aircraft landing system may be characterized in that it comprises four ground beacons, the first and second beacons being substantially spaced apart by the width of the airport runway, defining the aircraft stop point or the aircraft touch-down point and the third and fourth beacons being substantially spaced apart by the width of the airport runway and substantially separated from said first and second beacons by the length of the airport runway, the beacons responding to specific signals transmitted by the airborne radar device, the radar device calculating the average distance of the aircraft from the airport runway and the height of the aircraft relative to the plane containing said beacons.

BRIEF DESCRIPTION OF THE FIGURES

Other features and advantages of the invention will become apparent on reading the description, given by way of example, in conjunction with the appended drawings in which.

DETAILED DESCRIPTION

Figure 1:
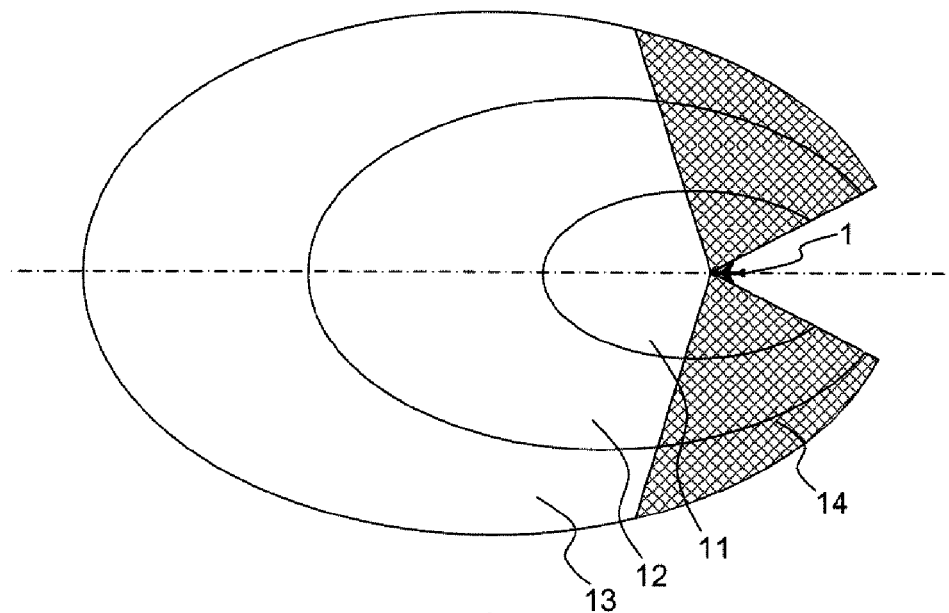
FIG. 1 shows, in a top view, the various detection zones for an aircraft provided with a sense-and-avoid function.

FIG. 1 shows, as a top view, the various detection zones for an aircraft provided with a sense-and-avoid function.

An aircraft 1 is flying in an airspace, and the detection system associated with it must cover a plurality of detection zones 11, 12, 13 within which the detection of targets entails different actions requiring different reaction times.

The first detection zone 11 is defined closest to the aircraft 1, and the representation of the first detection zone 11 in the principal plane of the aircraft 1 may be an ellipse, one of the foci of which coincides with the aircraft 1. Any detection of a target within the first detection zone 11 is considered to be an immediate hazard and an immediate reaction of the aircraft 1 is required, for example to undertake an automatic avoidance procedure.

The second detection zone 12 is defined, with reference to the aircraft 1, in a spatial field located beyond the first detection zone 11. The representation of the second detection zone 12 in the principal plane of the aircraft 1 may also be an ellipse. The detection of a target within the second detection zone 12 also requires a reaction, however the required reaction time may involve a human decision.

The third detection zone 13 is defined, with reference to the aircraft 1, in a spatial field located beyond the second detection zone 12. The representation of the third detection zone 13 in the principal plane of the aircraft 1 may also be an ellipse. The third detection zone 13 is the zone in which it is necessary to be able to detect the presence of a target so as to ensure flight safety. However, the detection of a target in the third detection zone 13 does not require a reaction.

The higher the flight velocity of the aircraft 1, the more the ellipses representing the various detection zones 11, 12, 13 are extended along their major axes and the further they contract along their minor axes.

It should be recalled here that the angular field that has to be covered by the detection system corresponds approximately with what a human pilot is capable of observing visually, i.e. typically about ±110° in azimuth and ±20° in elevation. The higher the flight velocity of the aircraft 1, the less important are the lateral and rear threats. There is an angular zone 14, substantially on either side of the lateral parts of the aircraft 1, and to the rear thereof, in which it is possible to consider only the relative velocity of the targets, for example determined by the radar system by determining the Doppler velocity, without compromising flight safety.

In general, it may be advantageous for the radar device with which the aircraft 1 is fitted to provide optimum coverage of different zones surrounding the aircraft 1 and for the antenna coverage, the on-target integration times and the associated processing operations to be able to be different depending on the zones in question, and even more advantageously to be able to be adapted dynamically, for example according to the flight parameters of the aircraft 1, and notably its velocity, its altitude, its attitude, etc. and/or according to the target tracking, for example with the possibility of providing, on demand, finer detection focussed on particular targets.

Figure 2A:
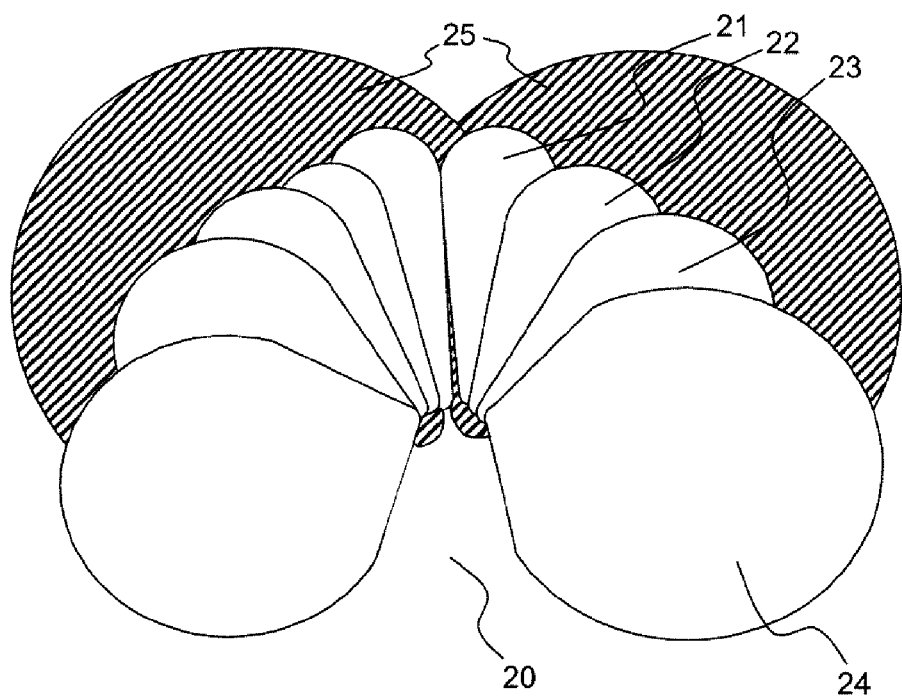
FIGS. 2A and 2B show, as an overview, the design of the antenna lobes of a radar device according to one exemplary embodiment of the invention, in azimuth and in elevation respectively.
Figure 2B:
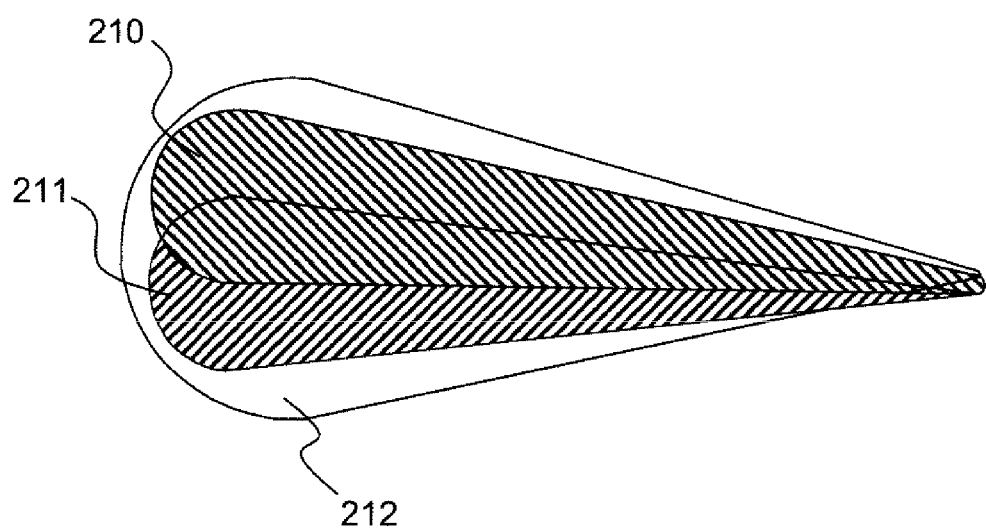

FIGS. 2A and 2B show, in overview, the design of the antenna lobes of a radar device according to one embodiment example of the invention, in azimuth and in elevation respectively.

In the example illustrated by FIG. 2A, a fixed antenna array, not shown in the figure, may be placed on the nose 20 of the aircraft 1. The configuration of the antenna array allows the formation of a plurality of receive beams 21, 22, 23, 24 represented in the principal plane of the aircraft 1 and the formation of a plurality of transmit beams 25. In the example illustrated by this figure, only two broad transmission lobes are generated on either side of the principal axis of the aircraft. For example, broader receive antenna beams 24, 23 may be formed for detecting targets in the lateral zones and the antenna beams 21, 22 for detecting targets in the forward zones, in which greater precision is required, may take the form of narrower beams.

Now with reference to FIG. 2B, the configuration of the fixed antenna array also allows the formation of a plurality of receive beams 210, 211 and the formation of one or more transmit beams, one transmit beam 212 being shown as an example in FIG. 2B.

It should be noted that a device according to the present invention may operate in active mode and in passive mode.

Figure 3:
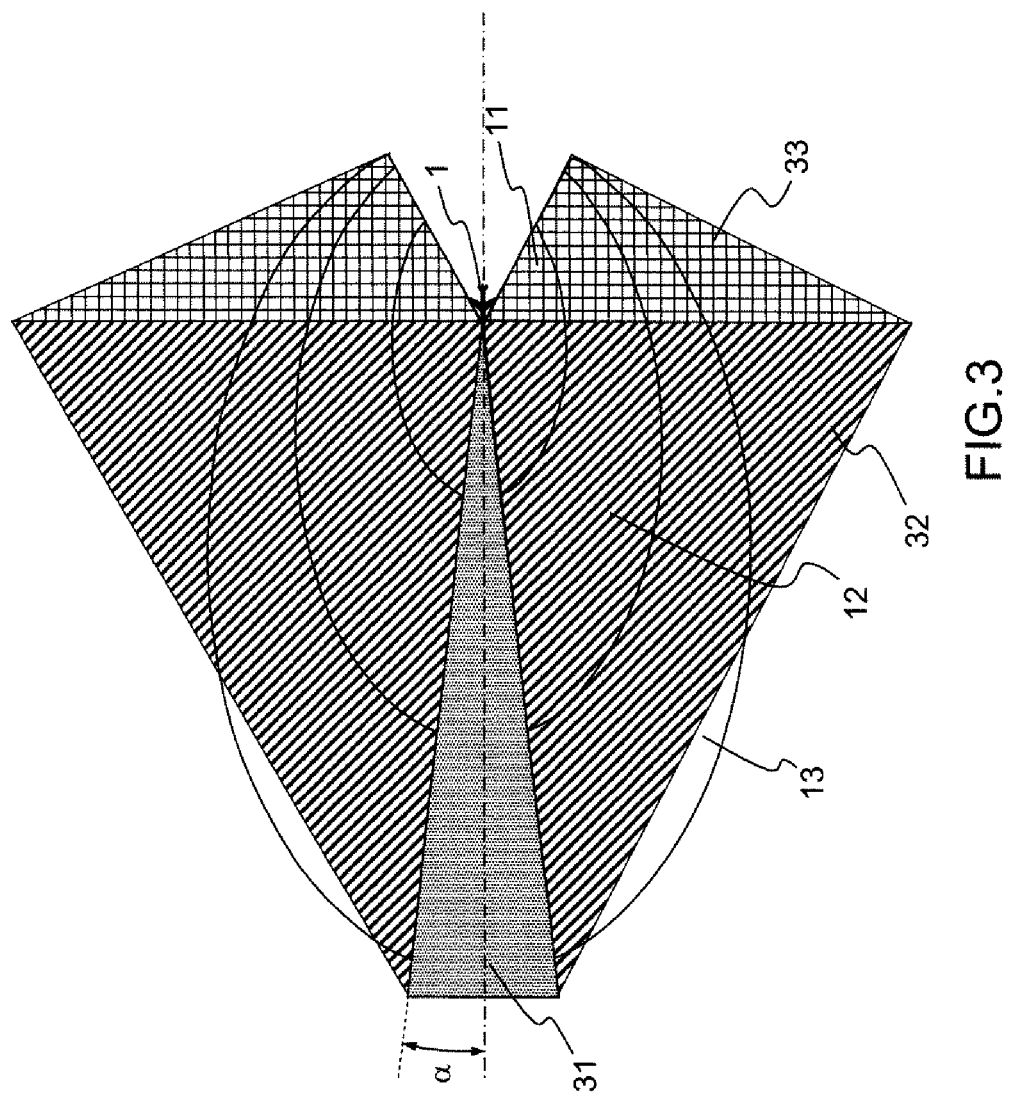
FIG. 3 shows, in a top sectional view, the various coverage zones for detecting an aircraft employing a radar device according to one exemplary embodiment of the invention.

FIG. 3 shows, in a sectional top view, the various coverage zones for detection by an aircraft employing a radar device according to one embodiment example of the invention.

As described above with reference to FIG. 1, the aircraft 1 is associated with three detection zones 11, 12, 13. It is possible for the radar system of the aircraft 1 to differentiate the processing according to the angle of arrival of the received signal and thus to define three angular detection zones 31, 32, 33.

The first angular detection zone 31 is for example defined by an angle α about the principal axis of the aircraft 1, forward thereof. Advantageously, the angle α may vary depending on the velocity of the aircraft 1.

The second angular detection zone 32 is for example defined substantially to the front of the aircraft 1, extending on either side of the first angular detection zone 31 as far as a plane orthogonal to the principal axis of the aircraft 1.

The third angular detection zone 33 is for example defined substantially to the rear of the aircraft 1, i.e. starting from the aforementioned plane perpendicular to the principal axis of the aircraft 1 and extending rearwards from the aircraft 1.

The first angular detection zone 31 is a zone of high criticality, for which the requirements in terms of computing power and integration time are the most demanding. It is also in this zone that precise knowledge of the positioning of the targets is of paramount importance. Notably, it should be pointed out that the velocity of the aircraft 1 and the velocity of the obstacle to be avoided may in the worst case be added. Also, the particular case of a balloon probe stationary in the air is very demanding in terms of signal integration time, since the RCS thereof may be small.

The Doppler frequency of a target may be written as $f_d=2(V_1+V_2)/\lambda$, $V_1$ being the displacement velocity of the aircraft 1, $V_2$ the displacement velocity of the target and $\lambda$ the wavelength corresponding to the frequency of the radar signal.

The approach velocity $V_R$ of a target may be defined as the sum of the velocities $V_1$ and $V_2$.

It is possible, in the case of targets detected in the first angular detection zone 31, to carry out a filtering operation with the aim of discriminating targets that are moving away, that is to say targets with a negative measured Doppler velocity $V_R$.

Advantageously, it is possible to carry out a filtering operation centred on the targets having a zero velocity, i.e. $V_2=0$, with the aim of releasing, for such targets, a maximum integration time. The purpose of such filtering is to provide an integration time sufficient to make up for small RCS targets and to distinguish them from noise. This makes it possible for example to deactivate FFT (fast Fourier transform) filters that are unnecessary and to concentrate on the velocities of interest in the case of the sense-and-avoid function. It is also possible to use a DBF (digital beam-forming) technique for the purpose of reducing the volume to be examined, corresponding to the elevation of the safety zone in question and to the azimuth of the safety zone.

Also advantageously, it is possible to carry out a filtering operation with the aim of eliminating aforementioned targets with a zero velocity, namely those emanating from ground clutter. Such filtering may for example be carried out by single-pulse processing in elevation based on a coloured transmission technique. The principle of coloured transmission is based on the transmission of a wave having a double waveform, a first transmission waveform being made up of at least two sinusoids of different frequency that are emitted simultaneously, and the second waveform being a pulsed wave. The reader may refer to the article entitled "Space-time transmission and coding for airborne radars" by François Le Chevalier published in Radar Science and Technology, vol. 6, December 2008, which describes the principle of coloured transmission by a radar device.

The second angular detection zone 32 is an essentially lateral zone of lower criticality than the first angular detection zone 31.

In the same way as in the case of the first angular detection zone 31, it is possible to carry out a filtering operation with the aim of discriminating targets that are moving away from the aircraft. However, it is unnecessary, for targets detected in the second angular detection zone 32, to carry out a particular filtering operation with regard to zero-velocity targets, since these may be targets that have already been detected beforehand in the first angular detection zone 31 or else targets having no risk of collision.

It is also necessary, for targets detected in the second angular detection zone 32, to measure their positions so as to determine their trajectories as a function of the trajectory of the aircraft 1. It is therefore possible to take into account the trajectories of targets that represent a risk of collision. A typical example of a method of determining the risk of collision with a target is described below with reference to FIG. 6.

The third angular detection zone 33 is a zone essentially to the rear of the aircraft 1 and hence of lower criticality. In the third angular detection zone 33, it is possible to consider only targets with a Doppler velocity greater than the velocity of the aircraft 1 and not to consider all the other targets, for the sake of minimizing the computing load for the radar system.

Figure 4A:
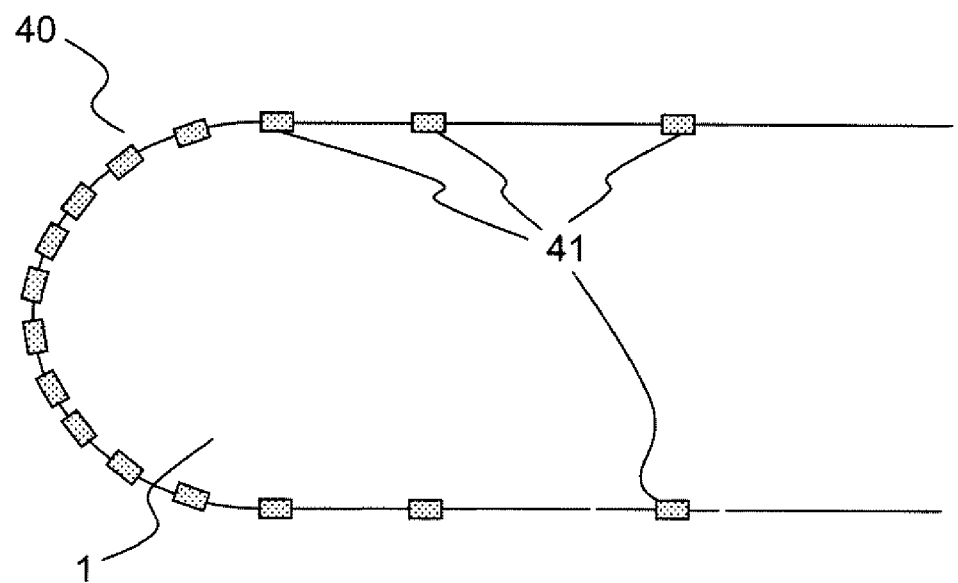
FIGS. 4A and 4B show, as a block diagram, respectively the arrangement of a plurality of antenna modules forming a radar device according to one exemplary embodiment and an exemplary embodiment of an antenna module.
Figure 4B:
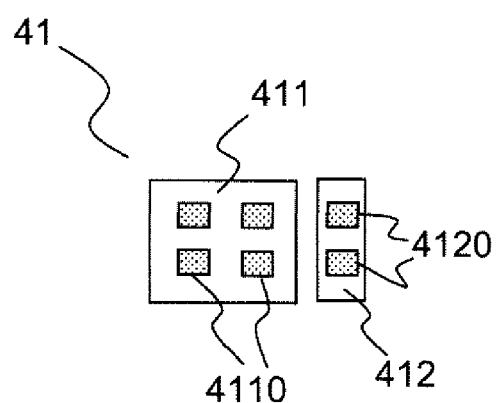

FIGS. 4A and 4B show, in block diagram form, the arrangement of a plurality of antenna modules forming a radar device according to one embodiment example and one embodiment example of an antenna module, respectively.

Referring to FIG. 4A, an antenna device 40 may comprise a plurality of antenna modules 41. In the example illustrated by this figure, the arrangement of the antenna modules 41 is that intended for being installed on the nose of the aircraft 1: such a solution provides preferential performance of the radar device along the principal axis of the aircraft 1 and makes it possible to minimize the constraints on fitting antenna modules 41 in the rear zones. This is because in the zones located substantially to the rear of the aircraft, only targets having a positive Doppler velocity are to be considered. The size of the detection lobes may be larger, since velocity filtering is predominant, and targets that may entail a collision are far from the ground clutter. Consequently, it is possible to have fewer divisions of the spatial coverage in these zones and to be content therein with wider angular precisions. The discrimination may be achieved in elevation and in distance. A receive antenna of the pseudo-static type, i.e. an antenna of the dipole type, then enables the precision constraints to be met.

Various examples of structures of the antenna device 40 and also possible uses in the aircraft 1 are described below.

The antenna modules 41 may be fixed, and placed so as to allow the formation of a plurality of beams, as described above with reference to FIG. 2. The antenna modules 41 may be antenna modules of the patch type. Their arrangement may for example make it possible, by associations, to form narrow beams on demand when detecting targets, for the purpose of refining the measurements and thus meeting the required performance levels in terms of angular precision. Typically, a radar having a sense-and-avoid function must allow detection of targets that may be at a distance of 0.5 NM (nautical miles). For example, in a typical example in which the detection distance of targets located forward of the aircraft 1 is 7 NM, detection angles must be 4° to guarantee separation in elevation. The 7 NM detection distance is determined by the relative velocities of carriers in a typical scenario for the purpose of respecting the prewarning time required for the manoeuvres, typically 23 seconds. Such a scenario corresponds, for example, to a typical configuration defined as follows: the target may be an aeroplane flying at a velocity of 800 km/h, i.e. 220 m/s, and the aircraft 1 may be flying at the same velocity in the opposite direction. Thus, the relative velocity of the two carriers is 440 m/s. The distance covered in 23 seconds with a velocity of 440 m/s is 10.12 km, i.e. about 5.5 NM. The choice of a safety margin of around 20% dictates a prewarning distance of 7 NM in the case of rapidly moving targets having an RCS of the order of 1 $m^2$. As regards targets with a lower RCS, the reaction margins may be larger. Airliners, capable of flying at higher velocities, provide on the other hand a higher RCS.

Now referring to FIG. 4B, an antenna module 41 may comprise a receive module 411 and a transmit module 412.

Each receive module 411 may comprise a plurality of individual receive channels 4110. Likewise, each transmit module 412 may comprise a plurality of radiating elements 4120. It is thus possible for each receive module 411 and transmit module 412 to generate a plurality of different beams. Such a configuration makes it possible, for example, to implement DBF for the purpose of simultaneously forming a large number of beams at reception, notably enabling a wide angular field to be covered, and a high antenna gain to be achieved.

Advantageously, the antenna modules 41 may be configured so that each is located close to adjacent antenna modules, so that, should an antenna module 41 fail, the adjacent antenna modules are able to make up for the deficiency. For example, the configuration of the antenna modules 41 may entail, should one antenna module 41 fail, a loss of around 3 dB on the range, reducing the far prewarning zone without thereby impairing the sense-and-avoid function. It is for example possible to detect the failure of an antenna module 41 by measuring the noise factor at a receive module 411, which must be sufficiently close to the noise factor at the adjacent receive modules 411. Should the failure of an antenna module 41 be detected, it is then possible to form a vacant beam that does not integrate the defective receive module, so that the losses in the direction in question are 3 dB at worst, i.e. 20% over the distance for detecting a 1 $m^2$ target flying at Mach 0.8 on a carrier aircraft which is itself flying with a velocity of Mach 0.8.

Of course, the illustration shown in FIG. 4B is given by way of example, and various configurations of the antenna modules 41 may be envisaged depending on the requirements. For example, it is possible to place, in the forward zones, antenna modules 41 comprising only radiating elements 4120, for example arranged in pairs of two radiating elements one vertically above the other, and to place, in the lateral zones, antenna modules 41 comprising only individual receive channels 4110, placed horizontally one beside another. It should be noted that the antenna modules 41 are not necessarily aligned, or spaced following a regular pattern. Such a configuration makes it possible for example to form transmit and receive beams, in azimuth and in elevation, which for instance conform to the examples described above, and illustrated by FIGS. 2A and 2B, that is, more generally speaking, beams of substantially non-homogenous or non-symmetrical nature around the carrier, allowing the opportunity for favouring preferred detection zones against others as a function of their interest. Notably, such a configuration allows favouring detection zones substantially in the forward axis of the carrier, which could not be afforded by configurations such as of the Synthetic Aperture Radar type, for example comprising antenna modules arranged parallel to the longitudinal axis of the carrier. Or else, it is possible to have antenna modules 41 each comprising a receive module 411 and a transmit module 412, each comprising a plurality of radiating elements 4120 and individual receive channels 4110 that can be activated or deactivated by switches, so as to form, depending on the envisaged requirements, a large variety of receive and transmit beams, in azimuth and in elevation.

A device according to the present invention may comprise antenna modules 41 arranged so as to be substantially on the surface of the aircraft, it being possible for these to be distributed in a regular or irregular manner.

Transmission and reception may be carried out sequentially or continuously. If transmission and reception are carried out continuously, they must be performed by means of separate transmit and receive antenna modules. If transmission and reception are carried out sequentially, the transmit and receive antenna modules may be co-localized.

The antenna modules 41 are placed substantially over the surface of the aircraft—they may also conform to the surface of the aircraft or may be flat, pressed on or beneath the skin of the aircraft 1, and may or may not be co-localized.

The antenna modules 41 may for example be centralized in a module assembly installed in a single physical block, placed on or in the nose of the aircraft 1, advantageously so as to be removable.

The antenna modules 41 may also be dispersed over the surface of the aircraft 1, not just on the nose of the latter. The antenna modules 41 may for example be installed so as to be offset in a pseudo-monostatic configuration and to provide heterogeneous coverage both in transmission and in reception. For example, it is possible to envisage fitting the receive antennas in the leading edges of the wings, so as to free up the nose, and on the sides of the aircraft in order to complement the coverage in azimuth. It is then necessary to phase-shift the antenna subarrays statically so as to adapt the coverage to the geometry of the carrier.

Installing beams, for example from patch antennas, enables them to be grouped in subarrays. The use of receive antennas with a single detection lobe in elevation simplifies the installation of the system on the aircraft. This is because in low frequency bands, so as to give the radar device sufficient gain and sufficient directivity, a large antenna area is required, making it impossible to fit one on a drone of small or medium size. The use of antennas with a wide lobe, typically 20° in elevation, but also the integration of several identical antennas on the skin of the aircraft, distributed horizontally around the structure of the aircraft, allows installation compatible with small drones.

Transmission may for example be carried out by an array which is not directional in azimuth but is directional in elevation. Fitting such a system is made possible by the small height of the receive antennas allowing overall coverage of the surveillance volume.

As in the manner described above with reference to FIG. 2B, transmission may take place by two or more beams in elevation, which may typically cover 110° in azimuth.

The final spatial discrimination may be achieved at the intersection of the transmit and receive lobes. For example, it is possible to choose a first transmit frequency F1 in the first receive beam 210 and a frequency F2 in the second receive beam 211, again with reference to FIG. 2B. Thus, a target may be detected in several receive beams. By temporally interlacing the transmissions at the frequencies F1 and F2 it is then possible for example to carry out amplitude goniometry in elevation or single-pulse treatment. In this way it is possible for targets to be precisely located. It should be noted that, in this example, the transmissions are carried out over two frequencies and over two beams in elevation, but it is also possible, if required, to transmit over a plurality of frequencies and/or a plurality of beams in elevation.

As regards the division of the antenna arrays in azimuth, this may be achieved either by DBF, by installing a receiver behind each receive module 411, or by sets of microwave switches allowing electronic scanning over the various axes while taking into account only the adjacent beams that contribute to receiving the echo.

Advantageously, it is possible to carry out a coloured transmission and thus the use of digital beam-forming in reception, combined with coloured transmission, enables the antenna beams to be adjusted dynamically according to the context and to the operational requirements.

The dimensions of the antenna beams may also be adjusted according to requirements, so as to optimize the number of receive antenna modules.

Figure 5:
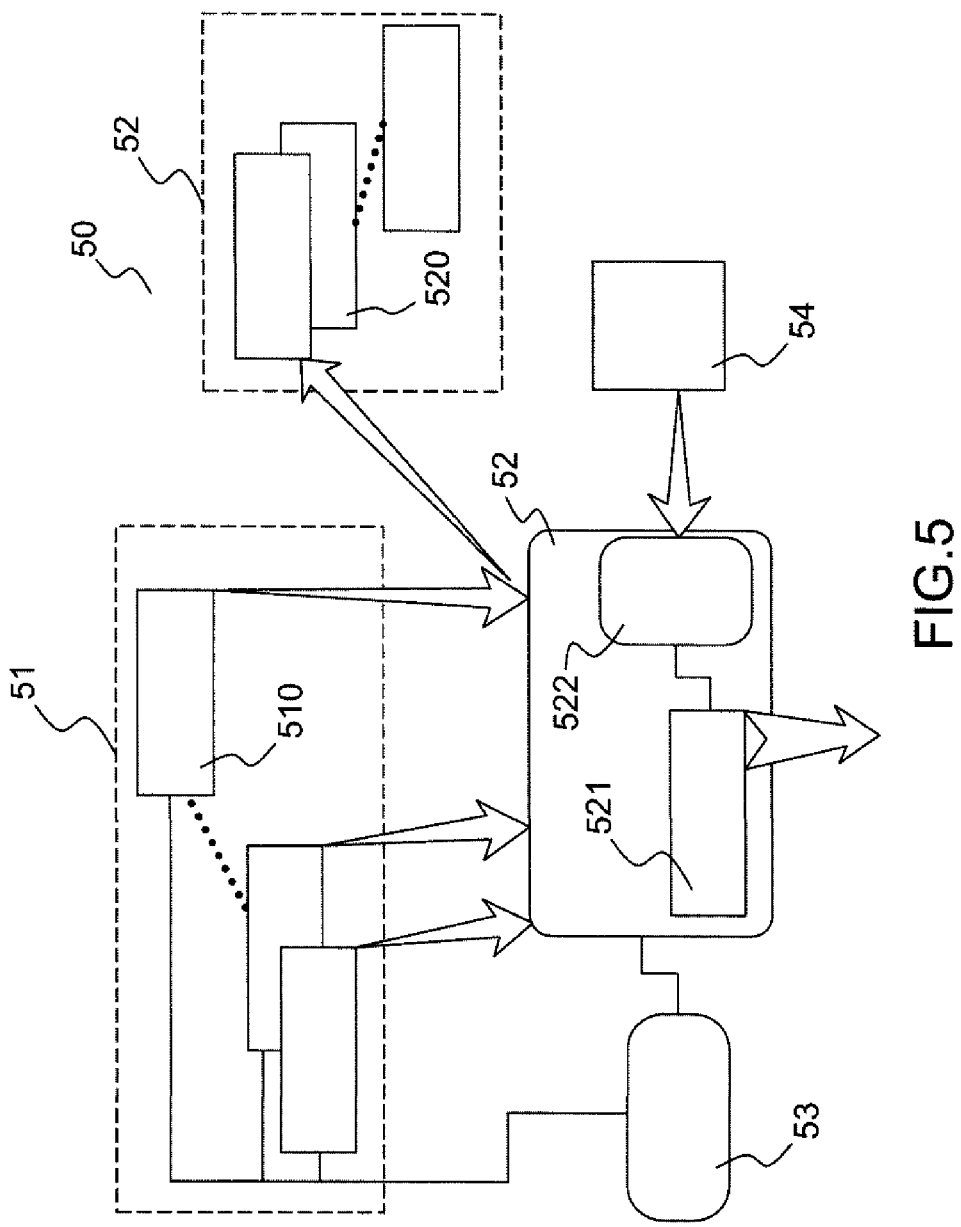
FIG. 5 shows a diagram illustrating the general architecture of a multifunction radar device according to one exemplary embodiment of the invention.

FIG. 5 shows a block diagram illustrating the general architecture of a multifunction radar device according to one embodiment example of the invention.

An architecture of the radar device 50 according to one embodiment example of the invention may comprise a receive antenna 51, comprising a plurality of receive antenna modules 510. The architecture of the radar device 50 also comprises a transmit antenna 52, comprising a plurality of transmit antenna modules 520.

The architecture of the radar device 50 furthermore includes radar processing means 52 which receive the signals coming from the receive antenna modules 510, send signals to the transmit antenna modules 520 and generate the information useful for the sense-and-avoid function. The signals coming from the receive antennas may be amplified and filtered by suitable means (not shown). The information useful for the sense-and-avoid function may for example be sent, via radio means, ADS-B devices or datalink means to air traffic control centres or ground stations. By publishing the data in the ADS-B format for example, it is possible to generalize the information using existing means. The information may be transmitted by the system datalink of the aircraft and then despatched via the Internet or any other communication means to the control centres. Should there be a failure in the links or no return of the information transmitted in the published ADS-B messages, a synthetic voice telephone link over the lines usually assigned by air traffic controllers may be used. These ATC (Air Traffic Control) centres may employ avoidance procedures using devices known per se, such as TCAS or T2CAS devices.

The information generated, recovered as output from the radar processing means 52, comprise: the relevant trajectories, data on passive targets and on active targets, the results of possible associations between passive and active targets, the data relating to the required reaction time, the collision predictions and the corresponding points and angles of collision, clouds detected in front of the aircraft 1, the calculated altitude, the detection of birds close to the aircraft 1, etc.

The radar processing means 52 may advantageously receive data 54 relating to the aircraft in which the architecture of the radar device 50 is installed. This data may for example comprise altitude data, attitude data—i.e. data relating to the positions of the control surfaces that control roll, pitch and yaw—and velocity and position data. This data may come from an inertial guidance system in the aircraft 1 and/or from various on-board sensors and instruments.

Advantageously, the radar processing means 52 may comprise a tool box 521 generating the aforementioned output information, useful for the sense-and-avoid function, and a decision matrix, which receives the data 54 relating to the aircraft 1 and puts it in the form for being sent as input to the tool box 521.

The radar processing means 52 may also control waveform-generation and frequency-selection means 53 for shaping the antenna beams at reception. The waveform-generation and frequency-selection means 53 notably enable DBF to be performed. For example, the waveform-generation and frequency-selection means 53 may, depending on the altitude of the aircraft, modify the angular selectivity on the receive beams and carry out DBF comprising more or fewer subarrays.

Advantageously, the radar processing means 52 may be dynamically programmed according to the data 54 relating to the aircraft 1. The aircraft data 54 enables as it were the radar device 50 to operate auto-adaptively, thus enhancing the security of the radar device 50.

Advantageously, a radar device according to the present invention may operate in the X-band. The X-band offers the advantage of having a low atmospheric absorption. Moreover, said band makes it possible to design antennas offering a good compromise, enables narrow beams to be formed, and forms part of the bands permitted for possible applications of the invention. Furthermore, using the X-band it is advantageously possible to use, during time windows provided for this purpose, the radar device according to the present invention as a weather radar and thus to detect, for example, the presence of clouds lying forward of the aircraft 1.

Figure 6:
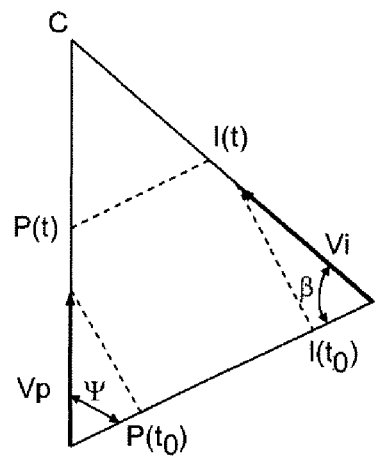
FIG. 6 shows a diagram illustrating one method of determining tracks with a risk of collision.

FIG. 6 shows a diagram illustrating one method of determining tracks having a risk of collision.

At an initial time $t_0$, the aircraft is at a position $P(t_0)$ and its velocity vector is $\vec{V}p\,(t_0)$. A target is at a position $I(t_0)$ and its velocity vector is $\vec{V}i\,(t_0)$. The necessary conditions for there to be a collision between the aircraft and the target may be reduced to the inclusion of the segment PI in a collision plane defined by the vectors $\vec{V}p$ and $\vec{V}i$. Let $\psi$ be the angle made between the segment $[P(t_0)I(t_0)]$ and the vector $\vec{V}p\,(t_0)$ and let $\beta$ be the angle made between the segment $[P(t_0)I(t_0)]$ and the vector $\vec{V}i\,(t_0)$.

The sufficient conditions may then be expressed, using the Thales theorem, through the equation:

$$Vp(t)\cdot\sin\psi(t) = Vi(t)\cdot\sin\beta(t) \tag{1}$$

If the vectors $\vec{V}p$ and $\vec{V}i$ are assumed to be constant over time, and likewise $\psi$ and $\beta$, then the condition expressed by equation (1) reduces to:

$$\frac{d\psi}{dr} = 0 \tag{2}$$
$$\frac{dV_{RR}}{dr} \text{ or}$$
$$\frac{d\psi}{dt} = 0$$
$$\frac{dV_{RR}}{dt} = 0,$$

r being the distance between the positions P and I and $V_{RR}$ being the radial homing velocity or the differential Doppler velocity.

Of course, it is necessary to take into account a near collision, which corresponds to the crossing of two aircraft within their safety spheres. This condition corresponds for example to testing the absolute value of the derivative of equation (2) above, that is to say the second derivatives, and to compare them with a threshold that depends on the safety zone in question.

Thus, as described above with reference to FIG. 3, the blips be characterized and classified according to the measured arrival angles and Doppler velocities. Furthermore, the blips that do not appear in the collision plane may be characterized and classified as:
  unconsidered tracks, for example for tracks moving away from the aircraft 1 or tracks for which the velocity component along an axis perpendicular to the principal axis of the aircraft 1 is zero;
  far tracks, i.e. tracks the distance of which from the aircraft 1 is above a predetermined threshold. For such tracks, it is for example possible that information relating to them is sent to an ATC centre and that a decision is then taken at the ATC centre and relaid back to the aircraft 1; and
  nearby tracks, the trajectory of which crosses the trajectory of the aircraft 1, which tracks allow intervention by the operator of the drone but have to be dealt with before an automatic avoidance reaction becomes necessary, i.e. before said tracks penetrate the safety sphere of the aircraft; and
  tracks requiring an immediate reaction, i.e. those involving too severe a confirmation feedback loop, or else for which the reaction time has passed, and which consequently impose an automatic diversion.

Advantageously, a radar device according to the present invention may use the information coming from airborne weather radars with which airliners are typically equipped. This is because it is possible, for a time window typically lasting a few milliseconds, to tune the receive frequency of the radar device to the frequency allocated to airborne weather radar devices that also operate in the X-band, the antenna modules then operating in a passive mode. A detection of the ESM (electronic support measure) type, the term corresponding to radar detectors, may then be implemented so as to detect the arrival detection of signals coming from weather radars and the arrival times. The coordinates thus determined may then be crossed with the coordinates of tracks detected by the aircraft's radar, and the tracking processing may produce associations of tracks accordingly. It should be observed that airborne weather radars, emitting high-power signals, detect with a longer range than the radar device fitted on the aircraft that enables the sense-and-avoid function to be implemented. Thus, by positioning via crossing and by characterizing the change in arrival angle, the processing task by the radar processing means 52 may be lightened, by discriminating the information not relating directly to the sense-and-avoid function, for example by eliminating lateral detections moving toward the rear of the aircraft.

Also, the detection of weather radars may allow antenna module failures to be detected. It is in fact possible to compare the theoretical values of the signals received by the various receive antenna modules 510, corresponding to detected aircraft fitted with airborne weather radars, with the actually measured values and to diagnose a failure of a receive antenna module 510 if the difference between the theoretical and measured values exceeds a predetermined threshold.

Advantageously, a radar device according to the present invention may comprise a receive channel dedicated to the detection of airborne weather radars and tuned to the transmission frequency of radars of this type. It is therefore unnecessary to open a time window for the detection of weather radars in the manner described above, and the detection of weather radars may then take place in parallel.

Advantageously, it is also possible, on receiving a signal coming from an airborne weather radar, to transmit a response echo signal so as to indicate the presence of the aircraft to the aircraft equipped with said weather radar.

Advantageously, it is possible to use the "ground avoidance" function for the purpose of consolidating synthetic ground data downloaded in the aircraft. It is therefore possible for the aircraft to execute autonomous flight without the use of a satellite ground positioning system, or a datalink.

Advantageously, it is also possible to implement an altimetry function based on the airborne radar device according to the invention. For example, it is possible to form three (or more) beams oriented for example at 30° to one another and substantially downwards from the aircraft, so as to take into account the ground return measurement. By measuring the distances, once the measurement angles are known (by knowing the configuration of the physical installation of the various elements and by knowing the attitude of the aircraft), it is possible to determine the height of the aircraft above the ground.

Also advantageously, a function for measuring the velocity of the aircraft relative to the ground, via an analysis, by the airborne radar device according to the invention, of the average ground speed, allows hybridization of the navigation function using the ground speed measurement. Such a solution is much more effective than a known hybridization solution based on the air speed. Thus, it is also possible to minimize the required performance of the primary or back-up inertial guidance system of the aircraft and thus optimize the overall weight of the aircraft, which may be particularly advantageous when the aircraft is a drone.

Typical examples of functions carried out by an airborne radar device according to the present invention will now be described:

tracking of the carrier aircraft may be implemented by the airborne radar device, and this tracking determines the trajectory to be followed for avoidance, taking into account the initial trajectory of the aircraft;

an ordered tactical situation of potential conflicts may be generated, for controlling, in the event of an emergency, an on-board avoidance device in respect of the priority targets and for sending all data requiring no emergency reaction to T2CAS devices;

advantageously, a device based on optical sensors may be controlled by the Doppler detection of the airborne radar device, so that said optical processing device confirms detections and invalidates any false detections. The optical processing device may for example comprise a number of electrooptic and/or infrared cameras, or else the optronic "ball" of the aircraft, if it is equipped therewith;

also advantageously, an acoustic detection device may also be controlled by the airborne radar device, so as to form beams directed at the detected targets. The acoustic detection device may for example be based on a plurality of omnidirectional microphones. Such an acoustic detection device known from the prior art is for example described in the article entitled "A simple procedure for tracking fast maneuvering aircraft using spatially distributed acoustic sensors" (Dommermuth F. M., The Journal of the Acoustical Society of America 1987, Vol. 82, No. 4, pp 1418-1424). Amplitude/phase parallel processing can then be applied, and digital beam-forming and/or goniometric processing may then be used to determine the direction of the targets. Target positioning via crossing and a merging of the tracks detected by the various devices may be implemented. The azimuth of the "sound" blips and of the radar blips must be identical in the inaccuracy volume;

all the data on the targets, recovered by the radar processing means 52, may be used to supply a TCAS or T2CAS device in the same way as in the case of data coming from the transponders of said targets. Thus, the avoid function of the TCAS or T2CAS device may be reutilized without recourse to additional equipment, and with minor certification supplements. This function may be extended to avoiding the non-cooperative tracks by integrating the new tracks in the normalized form of the cooperative tracks. A modification of the existing systems to allow this integration may be envisaged;

a prerecorded message or a message generated by voice synthesis means may be transmitted via the radio device of the aircraft in the case of an avoidance manoeuvre. The message may for example contain information relating to the position of the aircraft relative to the target in question, the type of target detected and the nature of the aircraft (for example a drone). The message may also contain information relating to the manoeuvre performed, for example "avoidance by the right", "change of altitude", etc. Also, the control tower or the ATC centre may be warned by the usual means, i.e. by the secondary transponder, to which may be added information regarding the calculated position of the detected target. Confirmation of the position of the detected target adds to the tactical situation, commonly referred to by the acronym TACSIT, of the ground station, if the latter is connected to the ATC network; and advantageously, the information delivered by an ADS-B transponder may be used to supplement the TACSIT. The tracks detected by the airborne radar device may be associated with the tracks published by the ADS-B system. Detected target position data, in terms of potential collision trajectories, transmitted by the airborne radar device according to the present invention may also be added to the database of the ADS-B system.

Advantageously, it is possible to use an airborne radar device according to the present invention for implementing an aircraft assisted landing or automatic landing function.

The radar device may be configured so as to behave, during predetermined time windows, as an existing airborne beacon used in an automatic landing system. The airborne radar device may for example transmit, during said time windows, specific signals that can be used by ground beacons and/or radars and/or can be configured to receive specific signals transmitted by the ground beacons and/or radars.

A first example of the application of a radar device according to the invention with an assisted or automatic landing function may consist in employing the airborne radar device as a replacement, or even redundancy, solution for an airborne radio beacon specifically provided for the guidance of aircraft. Airborne beacons of this type known per se, operating in conjunction with a ground radar, may be found in the prior art. At least one ground beacon of predetermined position relative to the radar makes it possible to refine the measurement of the distance of the aircraft from the radar and the angle of elevation of the aircraft relative to the radar. An assisted landing system based on this architecture is described for example in the patent application published under the reference PCT/EP 2005/055975. The ground radar allows targets to be detected and tracked within a cone located at the approach of a landing runway, typically defined by angles of ±20° in elevation and ±10° in azimuth. The data coming from the target tracking may then be communicated by electromagnetic means, either directly by the ground radar or by a dedicated beacon, to the airborne radar device and may also be used, for example by the radar processing means 52, to refine the tracking carried out by the airborne radar device or else to lighten the processing load for discriminating ground clutter in the runway approach zone.

A second example of the application of a radar device according to the invention having an assisted landing function may consist in employing the airborne radar device in conjunction with a plurality of ground beacons delivering a response to specific signals transmitted by the radar device, the radar device then receiving signals in return. An assisted landing system based on this architecture is described for example in the European patent application published under the reference EP 1963942. It is for example possible to place at least a first ground beacon indicating the start of the runway or the point of wheel touch-down and at least a second beacon indicating the end of the runway or the stop point. For each of the aforementioned beacons, it is possible to use two beacons located on either side of the runway, at the corresponding points. The beacons may respond in Doppler mode, and their echo with respect to the airborne radar has a fixed position. Since the position of these blips relative to the landing runway are known, it is possible to measure the angle of the descent path of the aircraft and the distance of the aircraft from the beacons. This measurement may be confirmed by triangulation, so as to provide the required redundancy level for an automatic landing procedure.

Figure 7:
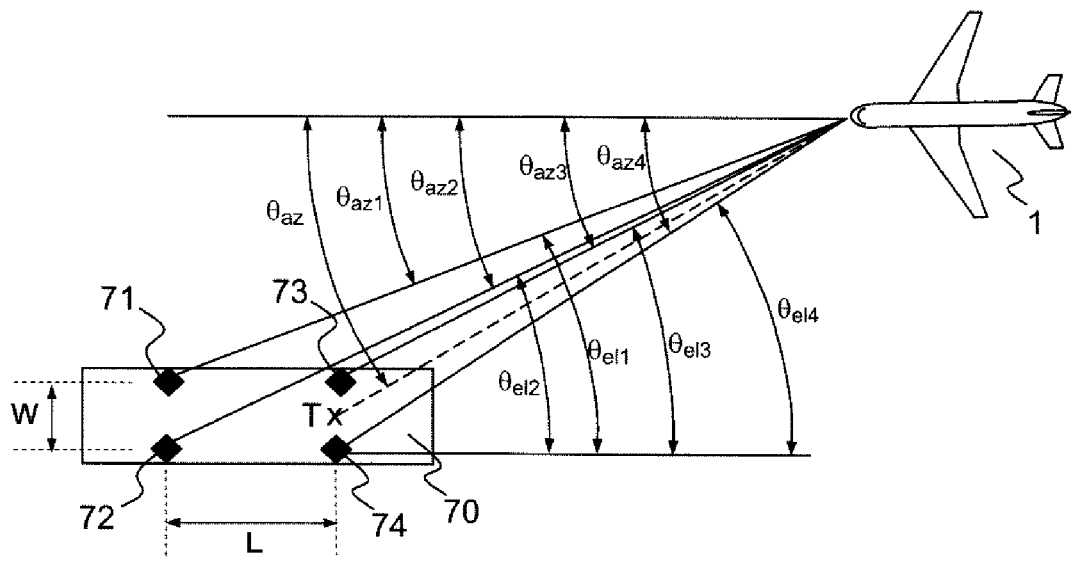
FIG. 7 shows, as a block diagram, a landing assistance device operating together with a multifunction radar, in one exemplary embodiment of the invention.

FIG. 7 shows, in block diagram form, an assisted landing or automatic landing device operating in conjunction with an airborne multifunction radar device in an example of an embodiment of the invention corresponding to the second application example described above.

As shown in FIG. 7, four radio beacons 71, 72, 73, 74 may be placed at defined locations relative to an airport runway 70 of length L and width W. For a given configuration for taking off from or landing on the airport runway 70, dependent notably on the wind conditions, the first two beacons 71, 72 in the example shown in the figure serve to indicate the stop point. Likewise, the third and fourth beacons 73, 74 serve to indicate the wheel touch-down point T. The two pairs of beacons thus formed are spaced apart by approximately the length L. The first and second beacons 71, 72 are spaced apart by the width W, as are the third and fourth beacons 73, 74.

In projection in the principal plane of the aircraft 1, the angles between the principal axis of the aircraft 1 and the straight lines joining the aircraft 1 to the first, second, third and fourth beacons 71, 72, 73, 74 respectively are denoted by $\theta_{az1}$, $\theta_{az2}$, $\theta_{az3}$, $\theta_{az4}$. The angle made between the principal axis of the aircraft 1 and the straight line joining the aircraft 1 with the touch-down point T is denoted by $\theta_{az}$. Similarly, in projection in a vertical plane, the angles between the principal axis of the aircraft 1 and the straight lines joining the aircraft 1 to the first, second, third and fourth beacons 71, 72, 73, 74 respectively are denoted by $\theta_{el1}$, $\theta_{el2}$, $\theta_{el3}$, $\theta_{el4}$.

The measurements of the angles $\theta_{az1}$ and $\theta_{az2}$ (and/or the angles $\theta_{az3}$ and $\theta_{az4}$ respectively) by the radar device, combined with multiple weighting performed by radar processing means to average the results of these measurements, enable the aircraft 1 to be located relative to the airport runway 70 in projection in the principal plane of the aircraft. Similarly, the measurements of the angles $\theta_{el1}$ and $\theta_{el3}$ (and/or the angles $\theta_{el2}$ and $\theta_{el4}$ respectively), knowing also the attitude of the aircraft as known by the inertial guidance system, enable the angle of descent of the aircraft to be measured.

By measuring the change in the aforementioned angles, and knowing the distances between the beacons 71, 72, 73, 74, it is possible to determine the distance of the aircraft 1 from the airport runway 70 and the height of the aircraft 1 above the airport runway 70 (or more precisely above the plane containing the beacons 71, 72, 73, 74) with an accuracy that increases as the inverse square of this distance. The distance and height values thus determined may be plotted and, knowing the flight velocity of the aircraft 1, compared with the values obtained from the on-board navigation devices so as to refine these values for the purpose of landing the aircraft.

Advantageously, in the second application example described, a radar may be added to the beacons 71, 72, 73, 74 so as to give the automatic landing system a higher level of redundancy.

It should be noted that it is the possibility of dynamically reconfiguring the transmit and receive parameters, and especially the possibility of reconfiguring the frequency bands and the waveforms, that enables the radar device to be used in the embodiments of the invention described above for carrying out numerous functions.

The invention claimed is:

1. Multifunction airborne radar device operating in active and passive modes, comprising a plurality of antenna modules fixed relative to the aircraft, which are placed substantially on the surface of the aircraft and form transmit and receive beams of width adapted to the aimed direction, allowing detection of targets for the implementation of a sense-and-avoid function.

2. Airborne radar device according to claim 1, in which the antenna modules are transmit antenna modules.

3. Airborne radar device according to claim 1, in which the antenna modules are receive antenna modules.

4. Airborne radar device according to claim 1, in which the antenna modules are transmit antenna modules and receive antenna modules.

5. Airborne radar device according to claim 1, in which the antenna modules comprise a plurality of individual receive channels.

6. Airborne radar device according to claim 1, in which the antenna modules comprise a plurality of radiating elements.

7. Airborne radar device according to claim 1, in which the antenna modules comprise a plurality of individual receive channels and a plurality of radiating elements.

8. Airborne radar device according to claim 1, in which the antenna modules conform to the surface of the aircraft.

9. Airborne radar device according to claim 1, in which the antenna modules are flat modules.

10. Airborne radar device according to claim 1, in which the antenna modules are placed on the skin of the aircraft.

11. Airborne radar device according to claim 1, in which the antenna modules are placed below the skin of the aircraft.

12. Airborne radar device according to claim 1, operating in the X-band and in sequential mode.

13. Airborne radar device according to claim 1, operating in the X-band and in continuous mode.

14. Airborne radar device according to claim 2, in which the receive or transmit antenna modules are placed in a unitary block that can be fastened to the nose of the aircraft.

15. Airborne radar device according to claim 2, in which the receive or transmit antenna modules are distributed over various parts of the surface of the aircraft.

16. Airborne radar device according to claim 2, further comprising processing means which receive data from the receive antenna modules and send processed data to the transmit antenna modules, and which produce target tracking data for targets detected in active and passive modes.

17. Airborne radar device according to claim 16, characterized in that the processing means send data to the transmit antenna modules capable of forming beams differing along various defined angular detection zones close to the aircraft.

18. Airborne radar device according to claim 13, which can be used as a weather radar during defined time windows.

19. Airborne radar device according to claim 16, in which the processing means further receive data relating to the aircraft, comprising information relating to its altitude, its velocity and/or its attitude, said data being exploited dynamically by the processing means.

20. Airborne radar device according to claim 16, in which a first angular detection zone is defined, forward of the aircraft, by an angular aperture a on either side of the principal axis of the aircraft in the principal plane of the aircraft, a second angular detection zone being defined by a representation in the principal plane of the aircraft extending substantially from the boundary of said first detection zone as far as the perpendicular to the principal axis of the aircraft, and a third angular detection zone extending substantially rearward of the aircraft from the boundary of said second angular detection zone.

21. Airborne radar device according to claim 20, in which the processing means carry out a filtering operation with the aim of discriminating those targets detected in one of the three angular detection zones that have a negative measured Doppler velocity.

22. Airborne radar device according to claim 20, in which the processing means calculate the velocity of the detected targets and carry out an additional filtering operation centred on those targets detected in the first angular detection zone that have a substantially zero velocity, increasing the integration time over said targets having a substantially zero velocity.

23. Airborne radar device according to claim 20, characterized in that the processing means carry out an additional filtering operation with the aim of discriminating said targets having a substantially zero velocity that are detected in the first angular detection zone, namely those emanating from ground clutter.

24. Airborne radar device according to claim 20, in which the processing means carry out a filtering operation with the aim of discriminating targets detected in said third angular detection zone, namely those for which the Doppler velocity is not greater than the velocity of the aircraft.

25. Airborne radar device according to claim 20, in which the processing means cause the aperture angle α defining the first angular detection zone to be varied dynamically according to the aircraft data.

26. Airborne radar device according to claim 20, in which the processing means cause the transmit waveform, the integration time or the antenna modules used, to be dynamically varied according to the aircraft data.

27. Airborne radar device according to claim 16, in which the processing means generate a time window during which the airborne radar device is tuned to the frequency of the airborne weather radars, allowing their detection.

28. Airborne radar device according to claim 16, in which the processing means are capable of detecting a fault in an antenna module and of modifying, where appropriate, the beams formed by the adjacent antenna modules so as to compensate for the loss of detection occasioned.

29. Airborne radar device according to claim 28, characterized in that the processing means consolidate the target tracking on the basis of said detection of airborne weather radars by an association of the corresponding tracks.

30. Airborne radar device according to claim 16, in which the processing means comprise a tool box generating the data relating to the sense-and-avoid function, comprising the filtered tracks, the detected passive targets, the detection of airborne weather radars, the associations of targets, the required reaction times, the predicted points and angles of collision, the detection of clouds to the front of the aircraft, the calculated altitude of the aircraft or the detection of birds to the front of the aircraft.

31. Airborne radar device according to claim 30, in which the data generated by the tool box is communicated to the outside by radio links, data links or ADS-B links.

32. Airborne radar device according to claim 30, capable of controlling an avoidance device on board the aircraft.

33. Airborne radar device according to claim 16, in which the processing means calculate the altitude of the aircraft.

34. Airborne radar device according to claim 1, capable of controlling external target detection devices enabling the tracking to be consolidated.

35. Airborne radar device according to claim 1, capable of generating radio messages describing the position, velocity, attitude or manoeuvres of the aircraft.

* * * * *